United States Patent [19]

Denney et al.

[11] Patent Number: 5,749,993

[45] Date of Patent: May 12, 1998

[54] METHOD OF MAKING AN AUTOMOTIVE CARPETING WITH PRECUT CONFORMING FOAM UNDERLAYMENT

[75] Inventors: Denys Denney, Riverside; Jose de Jesus Munoz Contreras, Apple Valley, both of Calif.; Vincenzo A. Bonaddio, Boothwyn, Pa.; David M. Johnsin, Riverside, Calif.

[73] Assignee: Foamex L.P., Linwood, Pa.

[21] Appl. No.: 595,573

[22] Filed: Feb. 1, 1996

[51] Int. Cl.⁶ .................. B26D 1/02; B28B 11/14; B32B 31/04
[52] U.S. Cl. .......... 156/214; 156/245; 156/250; 264/163; 83/19
[58] Field of Search ............ 156/212, 245, 156/250, 214, 254, 264; 181/288, 293, 294; 296/39.3, 97.23; 428/95, 96; 264/160, 163, 321; 83/19, 21, 176

[56] References Cited

U.S. PATENT DOCUMENTS

| | | |
|---|---|---|
| 801,673 | 10/1905 | Moore ........................... 264/163 |
| 2,057,873 | 10/1936 | Atwood ........................ 296/97.23 |
| 2,902,091 | 9/1959 | Dahle ............................. 83/176 |
| 4,529,639 | 7/1985 | Peoples, Jr. et al. ............ 428/95 |
| 4,721,641 | 1/1988 | Bailey ............................ 428/95 |
| 4,734,323 | 3/1988 | Sato et al. ..................... 181/288 |
| 5,523,040 | 6/1996 | Krouskop ..................... 264/163 |
| 5,534,208 | 7/1996 | Barr et al. .................... 264/160 |

FOREIGN PATENT DOCUMENTS

| | | |
|---|---|---|
| 551358 | 10/1956 | Belgium . |
| 1336014 | 7/1963 | France . |
| 572515 | 1/1958 | Italy . |

*Primary Examiner*—Richard Crispino
*Attorney, Agent, or Firm*—Natan Epstein

[57] ABSTRACT

A thermal and acoustic barrier for automotive floor pan carpeting is made by cutting synthetic foam sheet in a continuous process to create a foam surface complementary to the three dimensional shape of the floor pan surface. The cut foam sheet is bonded to the underside of the carpeting and installed with the complementary foam surface facing the floor pan.

13 Claims, 3 Drawing Sheets

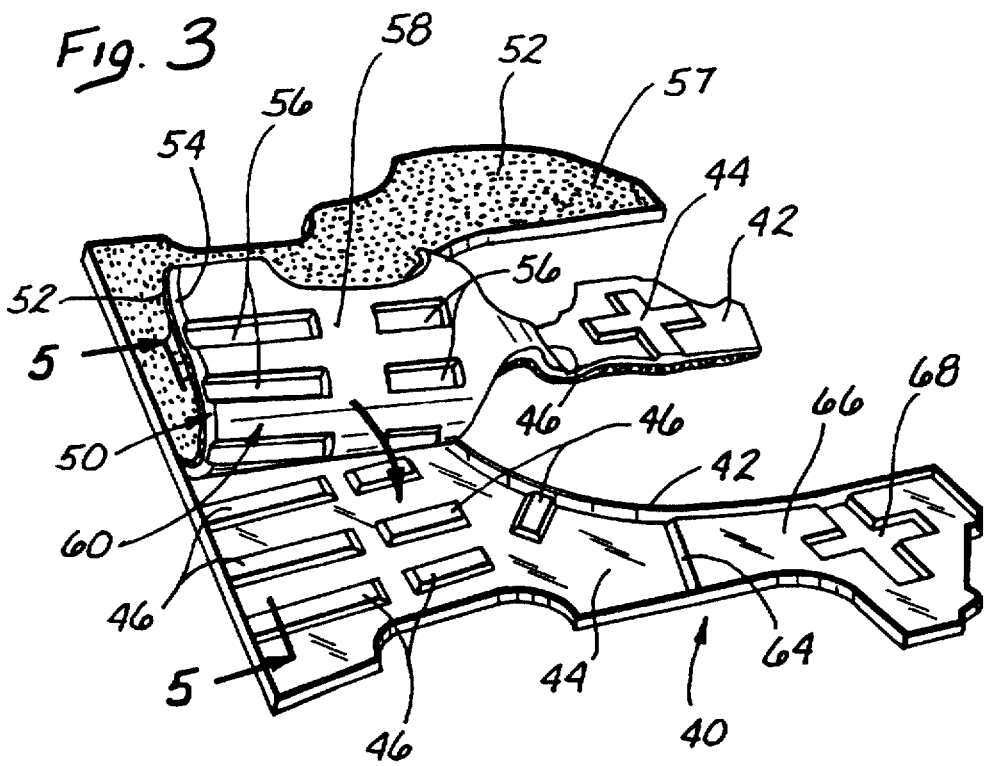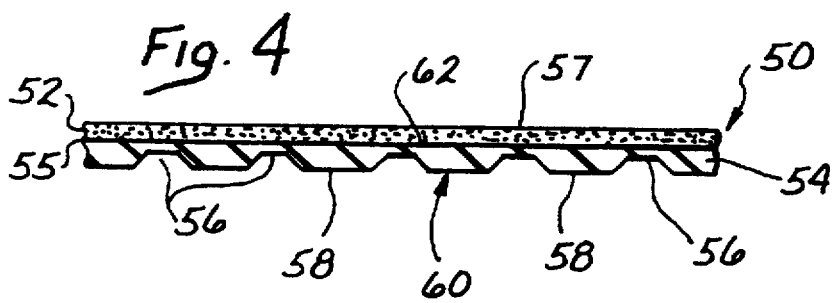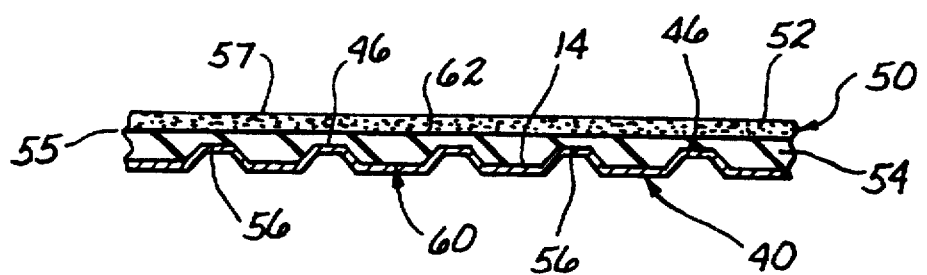

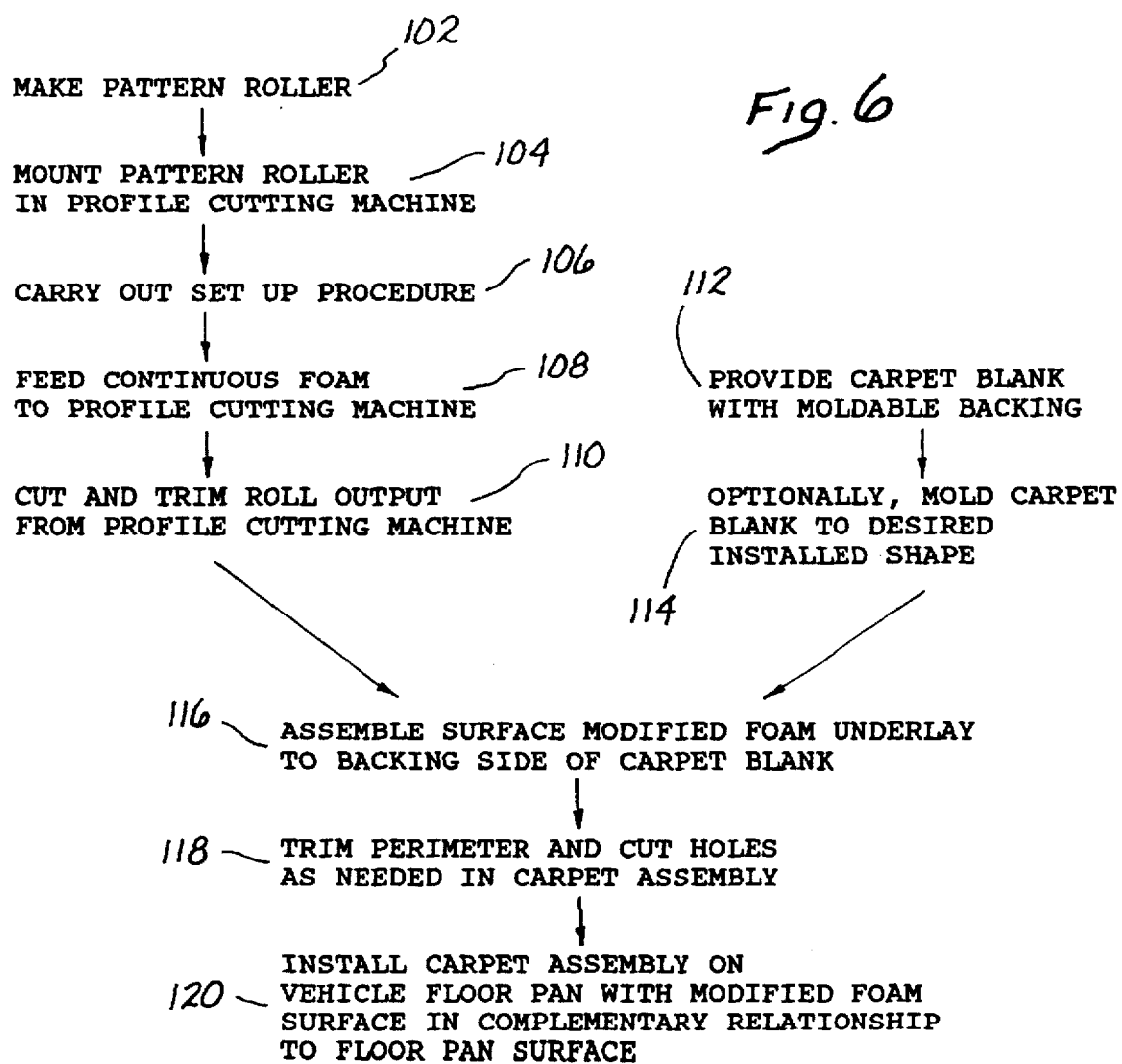

METHOD OF MAKING AN AUTOMOTIVE CARPETING WITH PRECUT CONFORMING FOAM UNDERLAYMENT

BACKGROUND OF THE INVENTION

1. Field of the Invention

This invention relates to thermal and acoustic barriers provided under carpeting on the floor-pan of automotive vehicles, and more particularly concerns such a barrier made of synthetic foam precut to conform to the floor-pan.

2. State of the Prior Art

The floor which supports the seating and interior cargo areas of automobiles is typically fabricated as a stamping of sheet metal, which is welded to other structural elements of the car body. The floor-pan normally has various ribs, channels, recesses, and humps which serve to impart structural strength and rigidity to the floor-pan and to accommodate various structures, conduits and cabling of the vehicle, both under the floor-pan and above it. As a result the typical automotive floor-pan has an irregular three-dimensional geometry which differs considerably from one vehicle model to another. The floor-pan geometry may include both large scale features and small scale features. Carpeting and underlayment can adapt to floor-pan features which have a relatively large radius of curvature, as for example, the center hump which runs along the center and accommodates a rear-wheel drive shaft. However, the relatively thick carpet assembly typically found in most automobiles does not follow well floor pan features having tighter radii of curvature. Such features include shallow ribs and channels formed for increasing the structural strength of the sheet metal, to contain electrical wiring or to serve as mountings for seats, etc.

It is conventional to lay carpeting over the entire interior area of the floor-pan for purposes of personal comfort and appearance. However, the carpeting also serves as an acoustic barrier to exclude road noise from the vehicle interior, and a thermal barrier to help maintain a comfortable interior climate in the vehicle against exterior heat or cold. For this purpose it is conventional to enhance the carpeting with an underlayment selected for its ability to dampen noise and insulate against thermal flow. Three principal underlayment technologies have evolved and are in use.

So called "shoddy" is a non-woven fiber material used in relatively thick sheets glued to the backing of the carpet. Where needed, more than one thickness of the shoddy is applied, and the layers are edge-contoured to fit between raised portions and into depressions of the floor-pan, to effectively fill the depressions and provide approximately level support for the carpeting itself. This method is widely used and is of relatively low cost. However, the shoddy sheets do not conform to vertical changes in floor-pan geometry except in multiples of sheet thickness, which makes for a relatively crude fit of the underlayment to the floor-pan. The result may be irregularities in the lay of the carpet due to the inability of the shoddy to closely follow the vertical contour of the floor-pan.

A second technique involves use of a moldable fibrous underlayment, marketed under the trade name "Marabond" by the Janesville Corporation. This material is first molded to a desired contour, designed to fit a particular floor-pan, and is then glued to the back of the carpeting.

A third approach is by molding-in-place a foamed resin directly unto the back of the carpet in a mold shaped to the contour of a target floor-pan.

In each case, carpeting material is first cut to a rough contour to make a flat sheet carpet blank. The carpeting can be of any suitable fiber, nylon being most commonly used for automotive applications, but may also be polypropylene or polyester, for example. The carpeting has a fiber side, which faces up in the finished automotive installation, and a backing side to which is applied a layer of moldable material which, when molded, can hold the carpet in a desired three-dimensional configuration as may be needed to fit the vertical contour of a particular floor-pan. The carpet blank is heated to soften the backing material and is then placed in a mold where it acquires the desired three-dimensional shape which it is to retain in the finished installation on the floor-pan of the vehicle. The mold is cooled so that the backing material solidifies and retains this desired shape.

Four different backing materials are in current use. One material known as "Massback" is a composite which is extruded in sheet form directly onto the backside of the carpet to provide both thermal and acoustic protection and does not require a separate barrier for this purpose. Two other materials, Polyethylene and EVA (Ethylene Vinyl Acetate) are also used as backing material for moldable carpeting, but both of these require a separate barrier material for thermal and acoustic protection. Typically, Massback is applied to the EVA, to provide the barrier. Finally, moldable latex can be applied as a backing to the carpet in a wet process and dried in place. At present, most of U.S. made automobiles use the Massback backing material, while most cars made in Japan use a Polyethylene backing on the floor-pan carpeting.

It will be apparent from the above that various combinations of carpet fiber, carpet backing and underlayment materials are possible. The choice is made on a case by case basis to meet the performance requirements and the weight and cost constraints of a particular application. Luxury line automobiles may be fitted with a higher performance, heavier and costlier carpet underlayment, while the opposite is the case for small economy vehicles.

While the conventional materials and techniques for providing thermal and acoustic floor-pan insulation generally work well, a continuing need exists for a relatively light weight underlayment material which can be closely fitted to the geometry of the floor-pan to minimize irregularities in the carpet surface caused by imperfect fit of the underlayment to the floor-pan. A further need exists for a method for precutting an automotive carpet underlayment to a contour which conforms in a generally continuous manner to the irregular geometry of the floor pan and particularly to floor pan features of varying vertical dimension. The new material should be cost-competitive with existing materials yet be relatively easy to make and install.

Of the existing underlayment materials and techniques, none are suitable for manufacture by continuous high volume processes. Shoddy material, while relatively low cost, is rather heavy and does not yield high quality carpet installations because of its limited fit to the vertical contour of the floor-pan. Molded Marabond underlayment is rather costly in material and requires that each piece be separately formed in a mold. Similarly, the molded-in-place technique requires injection of the barrier material directly onto the back of each carpet blank in a mold. The moldable materials currently in use as underlayment are relatively heavy. Marabond is a dense fibrous material while the molded-in-place approach uses a high density foamed resin.

What is needed is a method for making thermal/acoustic barrier underlayment for automotive carpeting using a rela-

3 tively light-weight material which can be precut, yet is fully conforming to the three dimensional geometry of the floor pan to provide a high quality fit of the carpeting over the floor pan, without resort to the molding processes in current use.

SUMMARY OF THE INVENTION

This invention responds to the aforementioned need by providing a novel method for making a precut fully conforming carpet underlayment useful as a lightweight thermal and acoustic barrier for automotive floor-pan carpeting. According to the novel method a pattern complementary to the three-dimensional shape of a floor-pan surface is made. A sheet of resiliently compressible synthetic foam having a first surface and a second surface, is pressed against the three-dimensional pattern such that the first surface of the sheet conforms to the pattern surface. Portions of the foam sheet pressed into recessed areas or cavities of the pattern surface are cut away. The sheet is then returned to an uncompressed condition to produce a modified foam surface similar in mirror image relationship to the three dimensional pattern surface, and consequently complementary to the three-dimensional shape of floor-pan surface. An initially planar carpet blank, having a fiber side and a backing side, may be shaped as by molding to a desired installed three-dimensional configuration. The second surface of the sheet of synthetic foam is then secured, as with adhesive, to the backing side of the carpet blank to make a carpet assembly. The carpet assembly is then installed on the floor pan with the modified surface of the foam sheet in complementary relationship to the floor-pan surface, such that the foam sheet supports the carpet in the desired installed three dimensional configuration on the floor pan. The carpet blank is made by cutting a planar carpet blank from a sheet of carpeting and, optionally, molding the planar carpet blank to the desired installed three-dimensional configuration prior to securing the sheet of foam.

The three dimensional pattern may be on a continuous surface arranged to define a nip with a pressure roller. One or both of the continuous surface and pressure roller are driven for continuous rotation, and foam sheet in continuous roll form may be fed between the rollers. Pressing and cutting of the foam sheet may be performed by advancing the sheet of foam through the nip and against a cutting edge mounted, in approximately tangential relationship to the continuous surface, for cutting away the portions of foam pressed into cavities of the pattern surface. The continuous surface may be on a pattern roller parallel to the pressure roller, or may be on a continuous belt supported between rollers parallel to the pressure roller. Both the first surface and the second surface of the foam sheet may be initially planar before the compressing and cutting steps, and the second surface of the foam sheet may remain planar following the compressing and cutting steps. The sheet of foam may be affixed to the backing side of the carpet blank by application of an adhesive material to the backing side and to the second surface of the foam sheet.

BRIEF DESCRIPTION OF THE DRAWINGS

FIG. 3 is a perspective drawing of a typical automotive floor-pan for use as a trunk compartment bottom, covered with a carpet assembly according to this invention, the carpet assembly being partially raised to show the modified surface of the synthetic foam underlayment;

FIG. 4 is a cross-section of the carpet assembly made up of the foam underlayment affixed to the backing side of the carpet blank;

FIG. 5 is a cross-section of the carpet assembly installed on the floor-pan, taken along line 5—5 in FIG. 3; and FIG. 6 is a flow-chart depicting the sequence of steps in the method of making automotive carpeting with pre-cut synthetic foam underlayment according to this invention.

DETAILED DESCRIPTION OF THE PREFERRED EMBODIMENT

Figure 1:
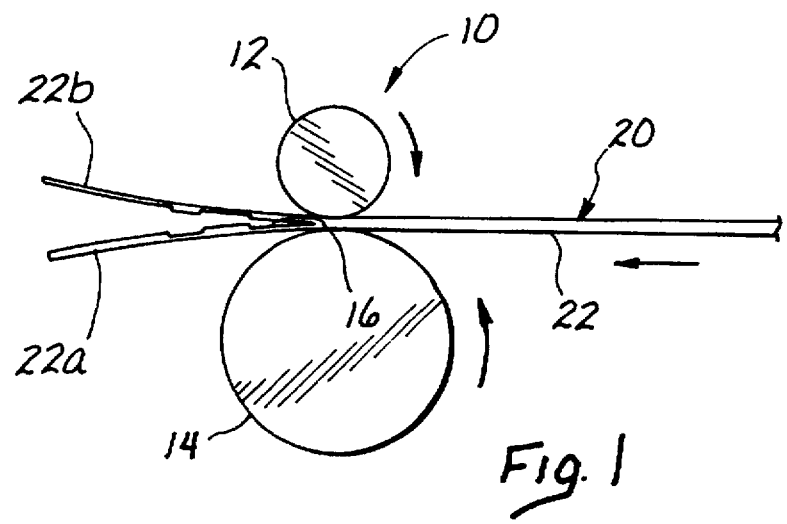
FIG. 1 is a side view of the rollers of the profile cutting machine used in the method of this invention.

The method of this invention is based in part on the "Three-dimensional surface shaping of synthetic foam pads by continuous rotary process" disclosed in co-pending patent application Ser. No. 08/477,282, filed Jun. 7, 1995, now issued as U.S. Pat. No. 5,534,208, which is a continuation of Ser. No. 08/122,701, filed Sep. 15, 1993, now abandoned and which is incorporated into the present application by this reference as if fully set forth herein, and is also disclosed in the aforementioned U.S. Pat. No. 5,534,208.

The referenced patent application discloses a method of cutting foam surfaces of arbitrary geometry by pressing a foam surface against a die or pattern roller having raised portions separated by depressions such that portions of the foam material are compressed to a reduced thickness against the raised portion of the pattern roller, and other portions of the foam material are extruded into the depressions defined on the pat tern roller surface. The foam in its compressed condition is advanced against a cutting edge which is positioned for cutting away those foam portions which are pressed into the pattern surface cavities while substantially sparing the portions of foam which are compressed by the raised portions of the pattern surface. It was explained in that application that the method there disclosed allows great flexibility in the foam surface geometries which can be obtained. Furthermore, as continuous foam stock can be fed to the pattern roller and knife edge, the method lends itself to continuous fabrication of foam sheeting with the desired surface geometry.

The method of the present invention, in its currently preferred form, makes use of a commercially available profile cutting machine. As shown schematically in FIGS. 1 and 2 of the drawings, two rollers are used on the cutting machine 10: a smooth, constant diameter backup or pressure roller 12, and a die or pattern roller 14. The cutting blade 16 of the machine is positioned so that the cutting edge is close to tangential contact with the pattern roller just behind the point of minimum separation between the rollers, on the output side of the rollers and facing the foam input side. The pressure roller 12 and pattern roller 14 are mounted parallel to each other but spaced apart to define an opening or nip 18. The opening 18 is much smaller than the normal uncompressed thickness of the sheet of foam 20 being processed through the machine 10, so that the lower surface 22 of the foam sheet is pressed with considerable force against the surface of the pattern roller 14 and conforms closely to the surface geometry of the pattern roller during passage through the opening 18.

It was found when cutting the relatively smaller thicknesses of heavier, stiffer foam typically needed for automotive underlayment applications, as opposed to the thicker, lighter foams typically employed for seat cushions, mattress pads and the like, that best results require that the knife edge be positioned closer to the point of minimum separation between the two rollers, i.e. near the point of tangent contact of the pattern roller with the foam sheet. The relatively thin foam sheeting used with automotive carpeting coupled with the rather deep cuts made in the foam sheeting call for an opening or nip 18 between the two rollers which is a small fraction of the normal uncompressed thickness of the foam sheet. This narrow opening makes it difficult to bring the knife edge to the required proximity to this tangent point if the two rollers are of equal, relatively large size. This problem is overcome by making the pressure roller relatively small in diameter compared to the pattern roller. For example, in the profile cutting machine 10 set up for purposes of this invention, the pressure roller 12 is 120 millimeters in diameter. The pattern roller 14, on the other hand, varies from about 8" to about 12" in diameter depending on the particular pattern being cut.

As in the method described in the referenced co-pending application, the pattern roller 14 is fabricated to generally mirror the foam surface geometry which is to be produced. The modified foam surface of the carpet underlayment complements the vertical geometry of the floor-pan surface to be covered with the carpeting. That is, the foam surface has raised portions which complement draws or depressions in the floor-pan and has recesses which receive and closely fit onto ribbing, humps and other raised portions of the floor-pan. The objective is to make a sheet of foam which has one surface modified to closely complement the vertical geometry of the floor-pan, so as to provide an upper foam surface which is as nearly planar as reasonably possible over those areas of the floor-pan where it is intended that the carpeting lay flat. In other portions of the floor-pan, the foam sheet may be required to follow the contour of the floor-pan surface, which may bend to form slanted or even vertical surfaces. For example, the front of a floor-pan typically has side walls and a front wall which define foot wells behind the engine compartment of the vehicle. On such areas of the floor-pan, the thickness of the foam may remain constant but the foam sheet, along with the carpeting, may be bent or curved away from a planar horizontal condition to cover vertical or slanting wall surfaces. This type of geometry is assumed by the foam underlayment at the time that it is laid on the floor-pan, and is not the result of the surface modification process nor is it reflected in the geometry of the pattern roller.

The method of this invention is depicted in the flow chart of FIG. 6. As shown there the method involves two branches or step sequences which produce the two main components of the carpet assembly which is the end product of this process. The left hand branch including steps 102 through 110 relates to the making of the pre cut foam underlayment contoured to complement the surface geometry of the floor-pan to be carpeted. The right hand branch, with steps 112, 114 concerns the making of a carpet blank generally sized and shaped to fit the floor-pan. The two branches come together at step 116 where the foam underlayment is assembled to the carpet blank to make the carpet assembly, which is then trimmed and installed.

In step 102, the floor-pan surface features are reproduced in three dimensions on the pattern roller in complementary fashion, i.e. a hump on the floor-pan is translated as a recess or cavity on the pattern roller, while depressions or draws on the floor-pan are mirrored as raised portions on the pattern roller. By way of example, the pattern roller 14 of FIG. 2 has elongated rectangular recesses 45 which complement surface ribs 46 in the floor-pan 40 of FIG. 3.

The depth of the recesses 16 on the pattern roller are typically a small fraction of the depth of the corresponding cuts to be made in the surface 22 of foam sheet 20. Because of the compression factor of the foam against the pattern roller, a shallow depression 16 in the pattern roller yields a much deeper depression in the foam. For example, a ⅝ inch thick sheet of foam compressed against a depression 116 of 20 thousands of an inch in the pattern roller, in the machine 10 described above, yields approximately a ½ inch deep depression in the foam sheet 20. The pattern roller 14 is mounted in the profile cutting machine, as step 104 in FIG. 6. The spacing between the two rollers 12, 14, all other factors being equal, determines the compression factor of the foam and consequently the ratio of pattern roller depth to foam cut depth. The depth of cut in the foam can be reduced for a given pattern roller depth by increasing the spacing between the two rollers, thus reducing the compression factor. By way of example, 19 millimeter (¾ inch) thick, 2.3 p.c.f. flame-retardant polyurethane continuous roll foam is currently used to make a carpet underlayment for the General Motors APV (All Purpose Vehicle). The thickness of the finished foam underlayment varies from 19 millimeters, at uncut portions of the foam sheet, to as little as 3 millimeters in areas where a 16 millimeters deep recess is cut in the foam sheet.

Figure 2:
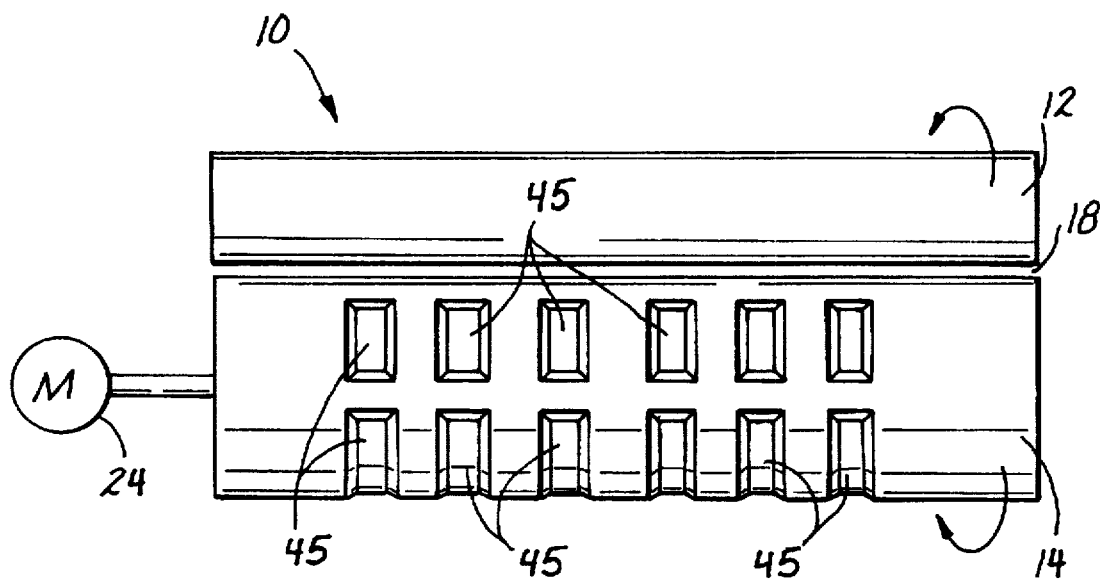
FIG. 2 is a front view of the output side of the rollers of FIG. 1.

A typical foam underlayment cut from continuous foam sheet according to this method will have at least a few and often many cut-away portions to define recessed areas in the foam surface. As the foam sheet runs through the profile cutting machine, these cut-away portions would present a clean-up and disposal problem if allowed to fall away individually from the foam sheet. This difficulty is avoided by setting the knife-edge of the cutting blade 16 so as to shave off a thin continuous layer of foam across the full width of the foam sheet as it passes between the rollers. This layer, which may be a single millimeter thick, serves as a webbing to interconnect the various portions of foam which are cut away from the continuous sheet by virtue of being pressed into recessed areas of the pattern roller. The result is that two continuous sheets emerge from the profile cutter 10, one sheet 22a containing the foam underlayment with the modified surface and the other a continuous sheet 22b of scrap material which is easy to manage for disposal, as shown in FIG. 1.

The position of the cutting edge 16 is adjusted to achieve this result during an initial set up procedure. Proper positioning of the knife-edge involves some trial and error, as the optimum position will vary for different diameters of the pattern roller and running speeds of the rollers, and with different grades of foam material. Generally, the edge of the knife blade is positioned in approximately tangent relationship to the pattern roller facing the advancing foam and is spaced slightly downstream from actual tangent contact at the point of minimum distance between the two rollers. In general, the smaller the diameter of pattern roller 14, the closer is the optimum position of the knife-edge 16 to tangent contact with the pattern roller.

A certain amount of trial and error is necessary to determine the proper settings of the profile cutter 10 for each combination of pattern roller 14, pressure roller 12 and grade of foam 20. Adjustments of the spacing 18 between the rollers, the position of the knife edge 16 relative to the pattern roller, and the speed setting of the pattern roller drive motor 24 for a given foam material thickness and density are all determined during a set up procedure, as step 106 in the sequence of FIG. 6.

Once the cutting machine 10 is set up, continuous sheet foam 20 is fed to the rollers, as step 108 in FIG. 6. The continuous sheet 22a of underlayment foam emerging from the cutting machine 10 is then subjected to secondary operations, such as cutting the continuous sheet 22a into individual underlayment parts, each of which may be of a length equal to or lesser than the circumference of the pattern roller 14, as part of step 110 in FIG. 6. Holes may be drilled at this stage in each underlayment part for receiving indexing pins of an assembly fixture used later in the process for accurately assembling the foam underlayment to carpet blanks.

A typical foam underlayment for a van or utility type vehicle is longer than can practically fit on the circumference of a single pattern roller 14. In such case the foam underlayment is made in several sections which are laid edge-to-edge to make up the necessary length on the vehicle floor-pan. The width of the pattern roller, however, can be made long enough to span the full width of the vehicle floor-pan. Consequently, multiple pattern rollers are used to cut the several sections of the underlayment, each section made as described above.

Turning to the flowchart of FIG. 6, a carpet blank is provided in step 112 of the process. The carpet blank is cut from roll stock with a moldable backing, as has been explained earlier herein. This carpet blank is cut to the approximate shape needed to cover the floor-pan being carpeted. Where necessary, the carpet blank is molded to a desired, installed three-dimensional shape, as step 114 in the flowchart, by first heating the carpet blank to a temperature sufficient for softening the moldable backing. The carpet blank is then placed in a mold which imparts the desired shape to the carpet blank and also cools the carpet blank to solidify the backing and set the carpet blank in the required shape. The carpet blank is then inverted, i.e. backing side up and placed on an assembly fixture which has a surface complementary to the floor-pan surface being carpeted, such that the carpet blank is fully supported in its three-dimensional configuration by the assembly fixture. The backing side of the carpet blank is then sprayed with a suitable adhesive such as a hot melt or a water based adhesive, and the surface modified foam underlayment is assembled to the backing side of the carpet blank, in step 116 of the flowchart. The planar, unmodified side of the foam underlayment is applied to the carpet backing, while the three-dimensionally modified foam surface of the underlayment is exposed. The carpet assembly is then trimmed with a water jet cutter to trim the perimeter to a precise fit with the floor-pan, and at the same time any holes that may be required, such as for passing mounting bolts of vehicle seats and seat belt attachments, are also cut at this time, as step 118 in the process of FIG. 6. Finally, the trimmed carpet assembly is installed on the vehicle floor-pan with the exposed modified foam surface in complementary relationship to the floor-pan surface, in step 120 of the process, as illustrated in FIGS. 3 and 5.

FIG. 3 shows a floor-pan generally designated by the numeral 40 which is a one-piece sheet metal stamping. The particular floor-pan illustrated in FIG. 3 forms the bottom of an automobile trunk compartment, and is used for ease of illustration over a larger and more complex passenger compartment floor-pan.

The floor-pan 40 of FIG. 3 has upturned edges 42 which run along the entire irregularly shaped perimeter of the pan. The interior of the pan 40 includes a planar sheet metal surface 44 which is structurally reinforced by parallel ribs 46 which rise from the pan surface 44. The ribs have a height of about ½ inch or less above the pan surface 44, and are structures typically found in automotive floor-pans for the purpose of increasing the rigidity of the sheet metal.

The pan 40 is covered with a carpet assembly 50 made according to the present invention. As better seen in FIG. 4, the carpet assembly 50 includes a carpet 52 and a foam underlayment 54. The foam underlayment, made according to steps 102 through 110 described above, has an exposed modified surface 60 and an unmodified planar surface 62, which is the upper surface of the foam underlayment in its installed condition. The modified surface 60 has recesses 56 defined between areas 58 of full thickness foam. The depth of the recesses 56 closely matches the height of the ribs 46 when the full thickness foam area 58 is laid down on the pan surface 44. Each rib 46 on the pan 40 has a corresponding recess 56 in the modified foam surface of the underlayment 54. FIG. 3 also shows the pan 40 having a raised planar area 66 joined to the planar surface 44 by a step 64, and a cruciform depression 68 defined in the raised area 66. This surface contour is accommodated by the foam underlayment 54 which mirrors this portion of the pan geometry in the form of a planar recessed area 42 from which rises a cruciform protrusion 44. The recessed area 42 is joined to the planar full thickness foam area 58 by a step 46 which complements the step 64 on the pan 40. When the foam underlayment 54 is laid down flat on the pan 40, the cruciform protrusion 44 closely fits into the cruciform recess 68, the planar recess surface 42 lies on the raised planar surface 66 and steps 64 and 46 complement each other, so that the unmodified upper planar surface 62 of the foam underlayment lies flat on the pan 40, and provides a continuous planar support surface for the carpet 52 over the entire pan 40.

FIG. 4 shows a cross-section of the carpet assembly 50, with the planar unmodified surface of the foam underlayment 54 secured by a layer of adhesive 55 to the backing side of the carpet blank 52. The carpet assembly has a fiber surface 57 which in the installed condition of the carpet assembly 50 extends over the entire floor-pan 40 in FIG. 3. FIG. 5 is a cross-section of the carpet assembly 50 installed on the floor-pan 40, showing the complementary relationship of the modified surface 60 of the foam underlayment to the vertical geometry of the floor-pan surface. It should be appreciated that the precut underlayment 54 makes a continuous complementary fit with the three-dimensional geometry of the floor pan, and can be contoured to complement floor-pan features of varying vertical dimension and arbitrary shape such as those illustrated in FIG. 3.

The synthetic foam material used for automotive carpet underlayment applications according to this invention is not limited to a particular type or grade of foam. Currently, good results are obtained using flame retardant polyurethane foam weighing from about one to about three p.c.f. (pounds per cubic foot). Floor-pan geometries which require bending of the foam and carpet away from a planar condition are best fitted with a softer, more compliant grade of foam, because the harder and stiffer foams have a tendency to separate from the carpeting due to its tendency to return to a planar state. In general, the choice of foam grade is a balance of various factors, such as total acceptable weight of the carpeting with regard to fuel economy of the vehicle, the degree of acoustic damping required and the kind of underfoot feel desired and appropriate for the particular vehicle.

Although throughout this specification reference is made to synthetic foam as the material used for making the precut conforming underlayment, it should be understood that the method of this invention is not limited to foamed materials only, and that the use of non-foamed compressible or elastomeric materials in lieu of synthetic foam is specifically contemplated.

From the foregoing it will be appreciated that a novel method has been disclosed for providing precut close fitting underlayments for automotive floor-pans using relatively light weight synthetic foams, and which is suited to high volume continuous production in a rotary cutting process. The method of this invention requires neither high temperature molding nor mixing of chemicals for making the underlayment, yet retains the high quality fit characteristics of molded underlayments. Continuous foam stock is simply cut by a cutting blade against a continuous pattern surface which in the presently preferred form is the cylindrical surface of a pattern roller having the necessary three-dimensional surface contour. The foam materials used for this process are readily available in a wide range of resins, weights and compressibility grades so that an optimum choice of foam material can be made for particular applications. Still further, while the underlayment according to this invention involves materials and processes which are novel in the automotive carpet underlayment field, the foam underlayment can be readily integrated into conventional automotive carpeting production facilities in that the foam underlayment, once fabricated, is handled in much the same way as conventional types of underlayment such as Shoddy or molded Marabond underlayments. Preparation of the carpet blank, attachment of the underlayment to the carpet blank and installation of the assembled carpet unit in the vehicle does not differ greatly from the same steps using the conventional underlayments.

It should be understood that while a preferred embodiment of the invention has been described and illustrated for purposes of clarity and example, various changes, substitutions and modifications to the described embodiment will become apparent to those possessed of ordinary skill in the art without thereby departing from the scope and spirit of the present invention which is set forth in the appended claims. Specifically, the present invention is not limited to a particular model of profile cutting machinery. Also, the continuous pattern surface of the present invention can be other than the cylindrical surface of a roller. For example, the three-dimensional pattern surface can be formed on a continuous belt which is supported between two rollers, of which one or both are motor-driven, and one of which is mounted to define a nip opening with a pressure roller. The belt surface allows a considerably greater length of the foam underlayment to be cut in a single revolution of the belt as compared to the maximum length possible on a roller of reasonable size.

What is claimed is:

1. A method of making an automotive carpet assembly having a thermal and acoustic barrier of compressible synthetic foam, comprising the steps of:

making a three dimensional pattern having cavities and raised portions complementary to a three dimensional shape of an automotive floor-pan surface;

providing a sheet of resiliently compressible synthetic foam having a first surface and a second surface;

pressing said three-dimensional pattern against said first surface of said sheet;

cutting away portions of said foam pressed into cavities of said pattern while substantially sparing portions of said foam compressed by said raised portions to make a modified surface on said sheet generally complementary to the three dimensional shape of said floor pan surface;

providing a carpet blank, said blank having a fiber side and a backing side; and affixing said second surface of said sheet to said backing side of the carpet blank whereby the carpet assembly comprised of said blank and said sheet may be installed with said first surface of said foam sheet in complementary relationship to the floor pan surface.

2. The method of claim 1 wherein said step of providing said carpet blank comprises the steps of cutting an initially planar carpet blank and molding said initially planar carpet blank to a desired installed three dimensional shape such that in an installed condition of said carpet assembly said sheet conforms to said three dimensional configuration of the floor pan and supports the carpet in said desired installed three dimensional shape on the floor pan.

3. The method of claim 1 wherein said three dimensional pattern is on a driven continuous surface mounted to define a nip with a pressure roller, and said steps of pressing and cutting are performed by advancing said foam sheet through said nip and against a cutting edge mounted in approximate tangential relationship to said continuous surface.

4. The method of claim 3 wherein said continuous surface is on a pattern roller parallel to said pressure roller.

5. The method of claim 1 wherein both said first surface and said second surface of said foam sheet are initially planar before said compressing and cutting.

6. The method of claim 1 wherein said second surface of said foam sheet is initially planar and remains planar after said compressing and cutting.

7. The method of claim 1 wherein said affixing comprises application of an adhesive material to said backing side and said second surface.

8. A method for making a precut conforming underlayment for automotive floor-pan carpeting, comprising the steps of:

making a three-dimensional pattern on a continuous surface, said pattern being complementary to a three dimensional shape of a floor-pan surface;

mounting said continuous surface to define a nip with a pressure roller;

rotationally driving one or both of said continuous surface and said pressure roller;

providing a sheet of resiliently compressible material having a first surface and a second surface;

feeding said sheet through said nip to compress said first surface of said sheet against said three-dimensional pattern and against a cutting edge positioned for cutting away portions of said foam pressed into depressions in said pattern while substantially sparing portions of said foam compressed by raised portions of said pattern, thereby to produce a modified surface on said sheet substantially complementary to the three-dimensional shape of said floor pan surface.

9. The method of claim 8 wherein said continuous surface is on a pattern roller parallel to said pressure roller.

10. The method of claim 8 wherein both said first surface and said second surface of said foam sheet are initially planar and parallel to each other.

11. The method of claim 8 wherein said sheet is continuous over a length corresponding to multiple rotations of said continuous surface, and further comprising the step of dividing said sheet into a plurality of underlayments.

12. A method for making a carpet assembly for an automotive floor pan, the floor pan having some geometric features to which may be conformed a carpet and other geometric features not readily conformed to by the same carpet, comprising the steps of:

providing a carpet blank having a moldable backing;

molding said backing to shape the carpet blank to a three dimensional shape adapted to conform to the some geometric features of the floor pan;

cutting a sheet of synthetic foam to make a foam surface configured to substantially conform to the other geometric features of the floor pan;

wherein said cutting is accomplished by pressing said sheet of synthetic foam against a three dimensional pattern surface and selectively cutting said sheet while in a compressed condition; and securing said sheet of synthetic foam to said backing with said foam surface facing away from said carpet.

13. The method of claim 12 wherein said pattern surface is a rotary surface and said cutting is by a cutting edge approximately tangential to the rotary surface.

* * * * *